(12) United States Patent
Wang et al.

(10) Patent No.: US 8,738,965 B2
(45) Date of Patent: May 27, 2014

(54) TEST METHOD AND TEST DEVICE FOR RESTARTING A COMPUTER BASED ON A HARDWARE INFORMATION COMPARISON AND A RESTART COUNT

(75) Inventors: Hai-Li Wang, Shenzhen (CN); Yong-Qian Deng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 351 days.

(21) Appl. No.: 13/205,642

(22) Filed: Aug. 9, 2011

(65) Prior Publication Data

US 2012/0047401 A1 Feb. 23, 2012

(30) Foreign Application Priority Data

Aug. 17, 2010 (CN) .......................... 2010 1 0255354

(51) Int. Cl.
*G06F 11/00* (2006.01)
*G06F 11/36* (2006.01)

(52) U.S. Cl.
USPC .................. 714/23; 714/2; 709/221; 709/222

(58) Field of Classification Search
USPC ......... 714/2, 23; 713/1, 2, 300, 310; 709/221, 709/222
See application file for complete search history.

(56) References Cited

U.S. PATENT DOCUMENTS

| | | | | |
|---|---|---|---|---|
| 5,680,547 | A * | 10/1997 | Chang ........................... | 709/222 |
| 6,253,320 | B1 * | 6/2001 | Sekiguchi et al. ................ | 713/2 |
| 6,928,538 | B2 * | 8/2005 | French et al. ..................... | 713/1 |
| 7,657,732 | B2 * | 2/2010 | Han ................... | 713/2 |
| 7,948,870 | B1 * | 5/2011 | Rijsman ........................ | 370/216 |
| 8,089,981 | B2 * | 1/2012 | Hiraki .......................... | 370/445 |
| 2001/0011348 | A1 * | 8/2001 | Blumenau et al. ............ | 713/100 |
| 2007/0073882 | A1 * | 3/2007 | Brown et al. ................ | 709/226 |
| 2008/0162675 | A1 * | 7/2008 | Bolay et al. ................... | 709/221 |
| 2008/0263347 | A1 * | 10/2008 | Chen ................................ | 713/2 |
| 2012/0011353 | A1 * | 1/2012 | Hayashida ........................ | 713/1 |

* cited by examiner

*Primary Examiner* — Joseph Schell
(74) *Attorney, Agent, or Firm* — Novak Druce Connolly Bove + Quigg LLP

(57) ABSTRACT

A test method for restarting a computing device communicating with a remote computer. The computing device is shut down and awakened by the remote computer. A second hardware information of the computing device after restarting the operating system of the computing device is compared with initial hardware information of the computing device when the computing device is initial started. Test results are stored to a predetermined storage path and displayed on a screen after the test ends.

9 Claims, 4 Drawing Sheets

TEST METHOD AND TEST DEVICE FOR RESTARTING A COMPUTER BASED ON A HARDWARE INFORMATION COMPARISON AND A RESTART COUNT

BACKGROUND

1. Technical Field

Embodiments of the present disclosure generally relate to computing device test technology, and more particularly to a test device and a test method for restarting computing devices.

2. Description of Related Art

Good test software that test computing devices cannot only shorten test times of the computing device, but also can ensure the accuracy and comprehensiveness of the tests. However, currently existing test software cannot test a computing device by awakening it remotely, and cannot track and record exceptions occurring during restarting an operating system of the computing device.

DETAILED DESCRIPTION

The application is illustrated by way of examples and not by way of limitation in the figures of the accompanying drawings in which like references indicate similar elements.

It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
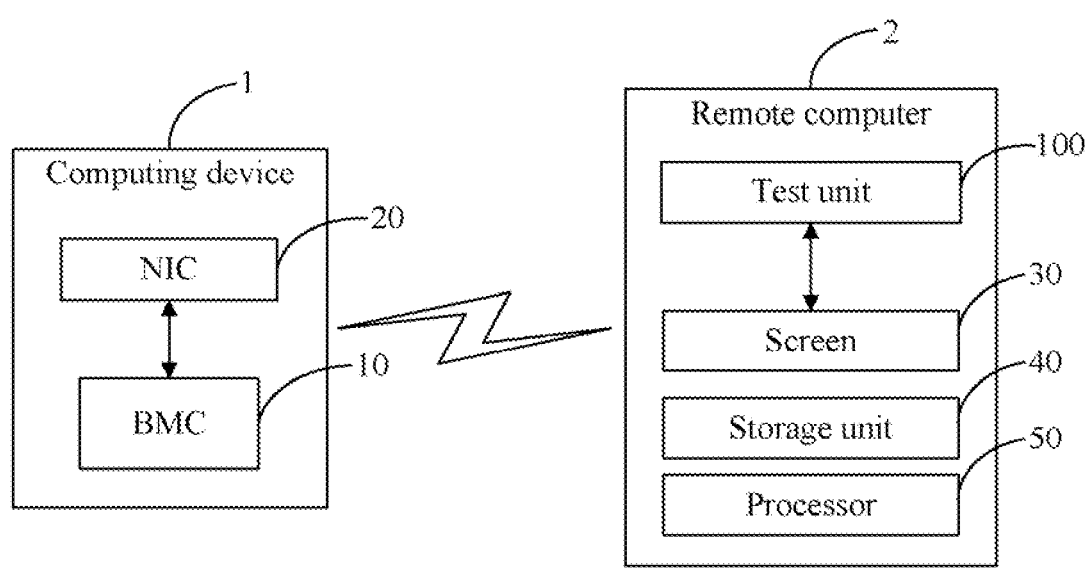
FIG. 1 is a block diagram of one embodiment of a remote computer including a test unit for restarting a computing device.

FIG. 1 is a block diagram of one embodiment of a remote computer 2 including a test unit 100 for restarting a computing device 1. In one embodiment, the computing device 1 includes a baseboard management controller (BMC) 10 and a network interface card (NIC) 20. The computing device 1 may be a personal computer, a server, or similar electronic device. The remote computer 2 communicates with the computing device 1 by a network, such as the Internet or an intranet. In other embodiments, the computer 2 can communicate with more than one computing device 1. The remote computer 2 further includes a screen 30, a storage unit 40, and a processor 50.

Figure 2:
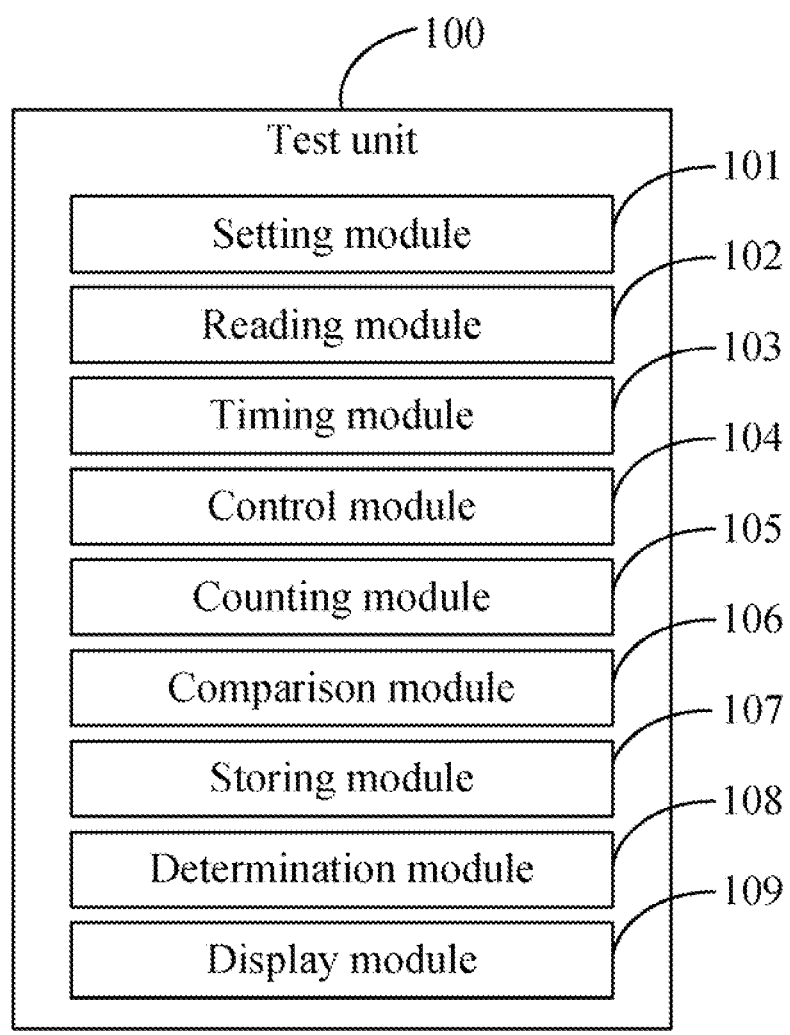
FIG. 2 is a block diagram of one embodiment of function modules of the test unit of FIG. 1.

In one embodiment, the test unit 100 may include one or more function modules (detailed description is given in FIG. 2). The one or more function modules may comprise computerized code in the form of one or more programs that are stored in the storage unit 40, and executed by the processor 50 of the remote computer 2 to provide the functions of the test unit 100 described later.

FIG. 2 is a block diagram of one embodiment of function modules of the test unit 100 of FIG. 1. In one embodiment, the test unit 100 includes a setting module 101, a reading module 102, a timing module 103, a control module 104, a counting module 105, a comparison module 106, a storing module 107, a determination module 108, and a display module 109.

The setting module 101 is operable to set a restarting frequency "N", a sleep delay time "M", and an awakening delay time "T" of the computing device 1, and set a storage path for storing test results. The restarting frequency "N" is the number of times the computing device 1 is to be awaken and shut down, and a number of times that an operating system of the computing device is required to be restarted. The sleep delay time "M" is a time from when the computing device 1 is started to when the computing device 1 is put to sleep. The awakening delay time "T" is a time from when the computing device 1 is put to sleep to when the computing device 1 should be awakened. The storage path is a predetermined path to a storage location in the storage unit 40.

The reading module 102 is operable to read a media access control (MAC) address of the computing device 1.

The reading module 102 is further operable to read initial hardware information of the computing device 1 when the computing device 1 is initially started. The initial hardware information may include status of hardware and peripheral hardware of the computing device 1, such as status of a central processing unit (CPU) (not shown), the storage unit 40, and a basic input output system (BIOS) (not shown) of the computing device 1.

The timing module 103 is operable to start a first timing when the computing device 1 is started, and determine whether the first timing reaches the sleep delay time "M".

The control module 104 is operable to shut down the operating system of the computing device 1 when the first timing reaches the sleep delay time "M", and force the computing device 1 to sleep.

The timing module 103 is further operable to start a second timing when the computing device 1 is put to sleep, and determine whether the second timing reaches the awakening delay time "T".

The control module 104 is further operable to awaken the computing device 1 remotely and restart the operating system of the computing device 1 when the second timing reaches the awakening delay time "T". In some embodiments, when the second timing reaches the awakening delay time "T", the control module 104 awakens the computer device 1 and sends the MAC address to the NIC 20. The NIC 20 compares the MAC address of the computing device 1 with a MAC address of the NIC 20. If the MAC address of the computing device 1 and the MAC address of the NIC 20 are the same, the NIC 20 sends a restarting signal to the BMC 10, then the BMC 10 restarts the operating system of the computing device 1 after receiving the restarting signal.

The counting module 105 is operable to count a restarting frequency of the computing device 1. Every time the operating system of the computing device 1 is restarted, the restarting count is incremented by 1.

The reading module 102 is further operable to again read hardware information of the computing device 1 after restarting the operating system of the computing device 1 to obtain a second hardware information for comparison with the initial hardware information.

The comparison module 106 is operable to compare the second hardware information with the initial hardware information to ensure that all items from the initial check are still recognized the device 1 and still operating properly.

The storing module 107 is operable to store test results according to the comparison to the predetermined storage path. The test results include the comparison results of the second hardware information with the initial hardware information. If the second hardware information and the initial hardware information are different, the test results further include error codes or missing hardware information of the computing device 1.

The determination module 108 is operable to determine whether the restarting count equals the predetermined restarting frequency "N". If the restarting count is not equal to "N", the restarting sequence continues.

The display module 109 is operable to read the test results from the predetermined storage path and display the test results on the screen 30, when the restart count equals "N".

Figure 3A:
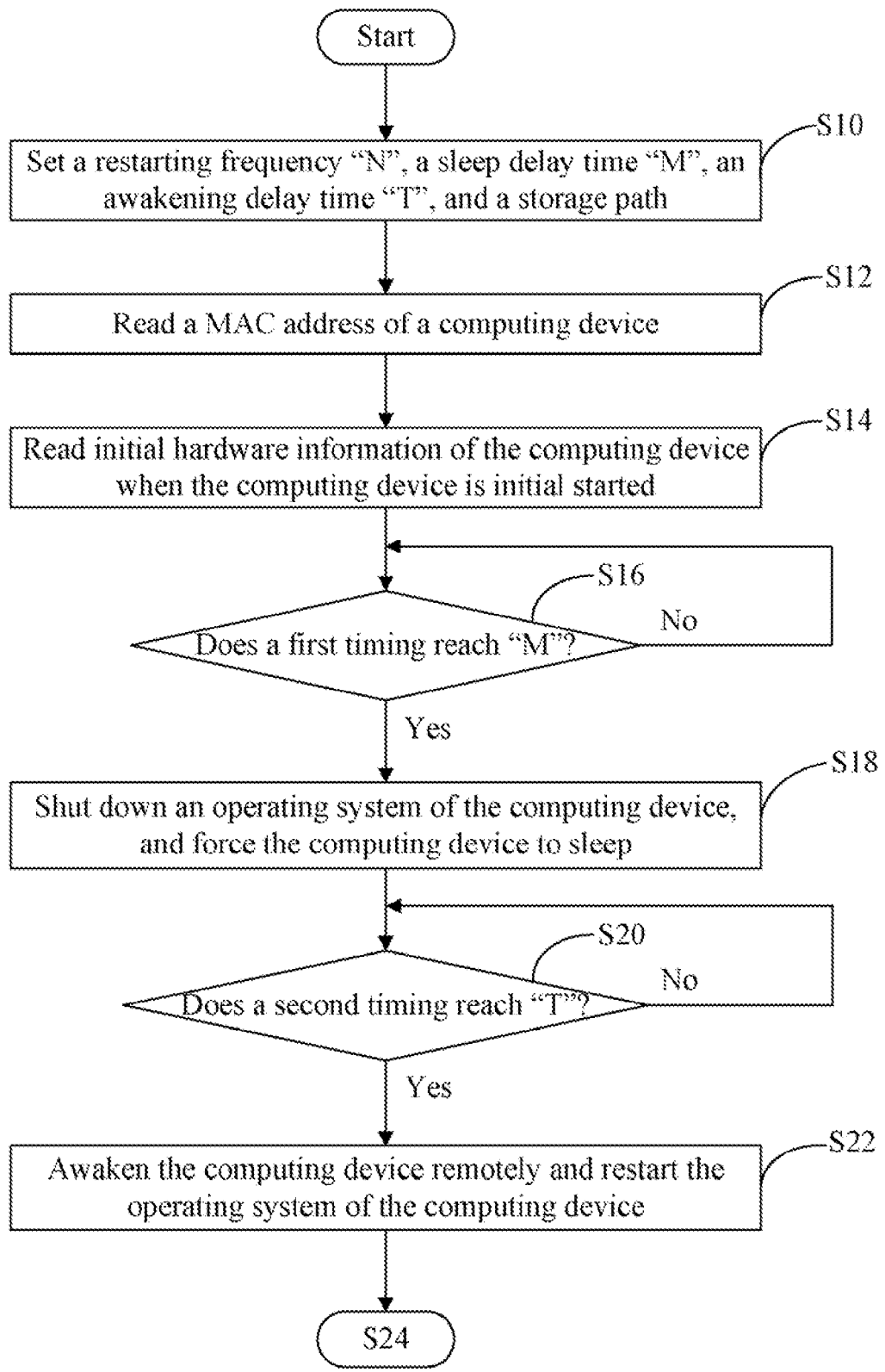
FIG. 3A-3B are flowcharts of one embodiment of a test method for restarting the computing device of FIG. 1.
Figure 3B:
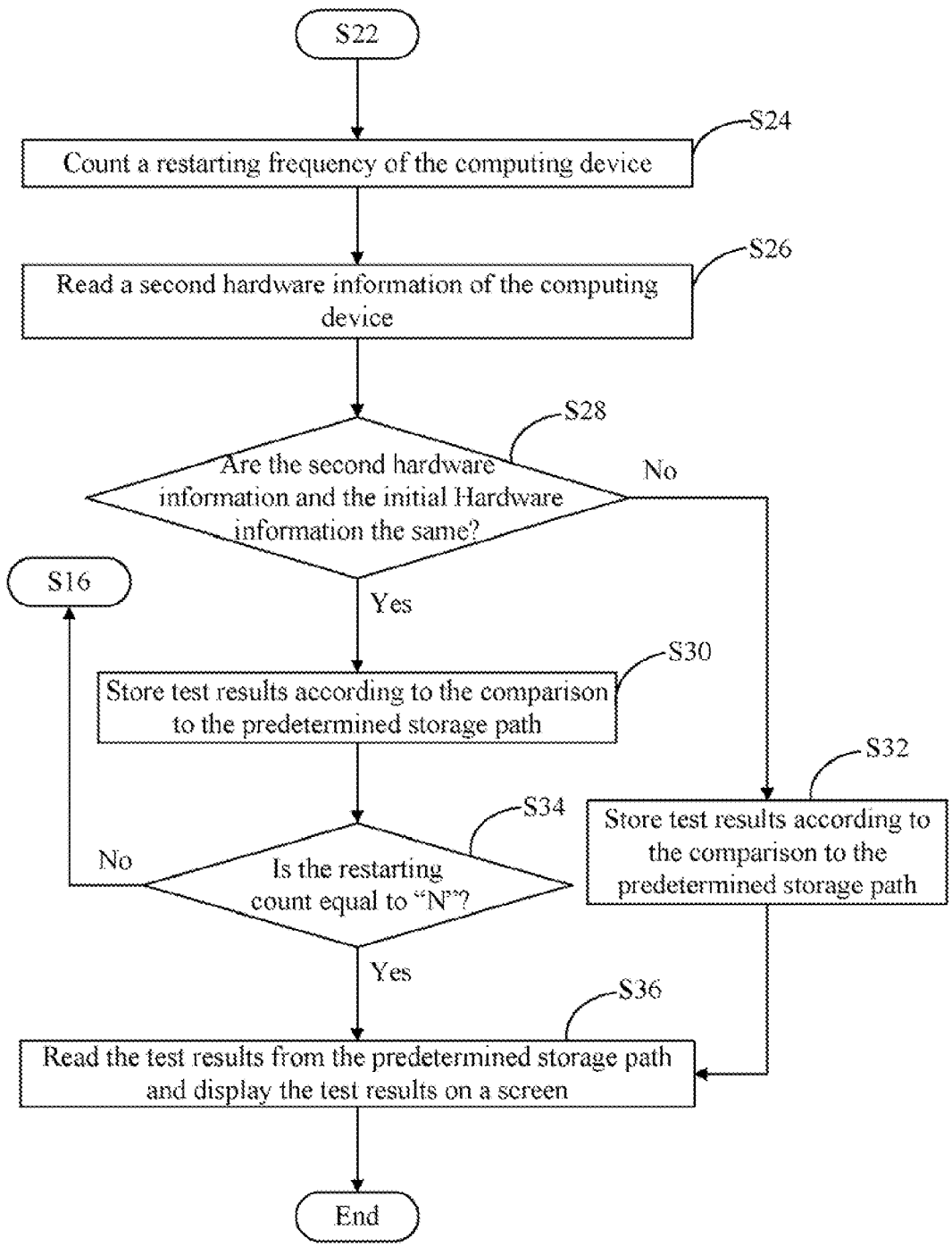

FIG. 3A-3B are flowcharts of one embodiment of a test method for restarting the computing device 1 of FIG. 1. Depending on the embodiment, additional blocks may be added, others removed, and the ordering of the blocks may be changed.

In block S10, the setting module 101 sets a restarting frequency "N", a sleep delay time "M", and an awakening delay time "T" of the computing device 1, and set a storage path for storing test results.

In block S12, the reading module 102 reads a MAC address of the computing device 1.

In block S14, the reading module 102 reads initial hardware information of the computing device 1 when the computing device 1 is initially started.

In block S16, the timing module 103 starts a first timing when the computing device 1 is started, and determines whether the first timing reaches the sleep delay time "M". If the first timing does not reach the sleep delay time "M", the procedure repeats block S16 to wait for the first timing reaching the sleep delay time "M".

In block S18, the control module 104 shuts down the operating system of the computing device 1 when the first timing reaches the sleep delay time "M", and force the computing device 1 to sleep.

In block S20, the timing module 103 starts a second timing when the computing device 1 is put to sleep, and determines whether the second timing reaches the awakening delay time "T". If the second timing does not reach the awakening delay time "T", the procedure repeats block S20 to wait for the second timing reaching the awakening delay time "T".

In block S22, the control module 104 awakens the computing device 1 remotely and restarts the operating system of the computing device 1 when the second timing reaches the awakening delay time "T". In some embodiments, when the second timing reaches the awakening delay time "T", the control module 104 awakens the computer device 1 and sends the MAC address to the NIC 20. The NIC 20 compares the MAC address of the computing device 1 with a MAC address of the NIC 20. If the MAC address of the computing device 1 and the MAC address of the NIC 20 are the same, the NIC 20 sends a restarting signal to the BMC 10, then the BMC 10 restarts the operating system of the computing device 1 after receiving the restarting signal.

In block S24, the counting module 105 counts a restarting frequency of the computing device 1. Every time the operating system of the computing device 1 is restarted, the restarting count is incremented by 1.

In block S26, the reading module 102 again reads hardware information of the computing device 1 after restarting the operating system of the computing device 1 to obtain a second hardware information for comparison with the initial hardware information.

In block S28, the comparison module 106 compares the second hardware information with the initial hardware information to ensure that all items from the initial check are still recognized the device 1 and still operating properly.

In block S30, the storing module 107 stores test results according to the comparison of the second hardware information with the initial hardware information to the predetermined storage path when the second hardware information and the initial hardware information are the same.

In block S32, the storing module 107 stores test results according to the comparison of the second hardware information with the initial hardware information to the predetermined storage path when the second hardware information and the initial hardware information are different. The test results further include error codes or missing hardware information of the computing device 1.

In block S34, the determination module 108 determines whether the restarting count equals "N". If the restarting count is not equal to "N", the procedure returns to block S16, the restarting sequence continues.

In block S36, the display module 109 reads the test results from the predetermined storage path and displays the test results on the screen 30, when the restarting count equals "N". The test results include the above-mentioned comparison results, and error codes or missing hardware information.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A test method for restarting a computing device, the computing device communicating with a remote computer, the test method comprising:
   (a) setting a restart count "N", a sleep delay time "M", and an awakening delay time "T" of the computing device;
   (b) reading a media access control (MAC) address of the computing device;
   (c) reading initial hardware information of the computing device and starting a first timing in response to an initial start of the computing device;
   (d) shutting down an operating system of the computing device in response to the first timing reaching the sleep delay time "M", and forcing the computing device to sleep;
   (e) starting a second timing in response to forcing the computing device to sleep, and awakening the computing device remotely and restarting the operating system of the computing device in response to the second timing reaching the awakening delay time "T";
   (f) counting the restart count of the computing device;
   (g) reading a second hardware information of the computing device;
   (h) comparing the second hardware information with the initial hardware information;
   (i) storing test results according to the comparison in a storage device;
   (j) determining whether the restart count equals the predetermined restart count "N"; and
   (k) returning to step (d) and repeating steps (d) through (k) in response to the restart count is not equal to "N", or reading the test results from the storage device and displaying the test results in response to the restart count equaling "N".

2. The test method as claimed in claim 1, wherein step (e) further comprising:
awakening the computing device and sending the MAC address to a network interface card (NIC) of the computing device in response to the second timing reaching the awakening delay time "T";
the NIC comparing the MAC address of the computing device with a MAC address of the NIC, and sending a restarting signal to a baseboard management controller (BMC) of the computing device in response to the MAC address of the computing device and the MAC address of the NIC are the same;
the BMC restarting the operating system of the computing device after receiving the restarting signal.

3. The test method as claimed in claim 1, wherein the test results including comparison results of the second hardware information with the initial hardware information, if the second hardware information and the initial hardware information are different, the test results further include error codes or missing hardware information of the computing device.

4. A non-transitory storage medium storing a set of instructions, the set of instructions capable of being executed by a processor to perform a test method for restarting a computing device, the computing device communicating with a remote computer, the test method comprising:
(a) setting a restart count "N", a sleep delay time "M", and an awakening delay time "T" of the computing device;
(b) reading a media access control (MAC) address of the computing device;
(c) reading initial hardware information of the computing device and starting a first timing in response to an initial start of the computing device;
(d) shutting down an operating system of the computing device in response to the first timing reaching the sleep delay time "M", and forcing the computing device to sleep;
(e) starting a second timing in response to forcing the computing device to sleep, and awakening the computing device remotely and restarting the operating system of the computing device in response to the second timing reaching the awakening delay time "T";
(f) counting a the restart count of the computing device;
(g) reading a second hardware information of the computing device;
(h) comparing the second hardware information with the initial hardware information;
(i) storing test results according to the comparison in a storage device;
(j) determining whether the restart count equals the predetermined restart count "N"; and
(k) returning to step (d) and repeating steps (d) through (k) in response to the restart count is not equal to "N", or reading the test results from the storage device and displaying the test results in response to the restart count equaling "N".

5. The non-transitory storage medium as claimed in claim 4, wherein step (e) further comprising:
awakening the computing device and sending the MAC address to a network interface card (NIC) of the computing device in response to the second timing reaching the awakening delay time "T";
the NIC comparing the MAC address of the computing device with a MAC address of the NIC, and sending a restarting signal to a baseboard management controller (BMC) of the computing device in response to the MAC address of the computing device and the MAC address of the NIC are the same;
the BMC restarting the operating system of the computing device after receiving the restarting signal.

6. The non-transitory storage medium as claimed in claim 4, wherein the test results including comparison results of the second hardware information with the initial hardware information, if the second hardware information and the initial hardware information are different, the test results further include error codes or missing hardware information of the computing device.

7. A remote computer, the remote computer communicating with a computing device, the remote computer comprising:
a storage unit;
a screen;
at least one processor; and
one or more programs stored in the storage unit, executable by the at least one processor, the one or more programs comprising:
a setting module operable to set a restart count "N", a sleep delay time "M", and an awakening delay time "T" of the computing device;
a reading module operable to read a media access control (MAC) address of the computing device;
the reading module further operable to read initial hardware information of the computing device in response to an initial start of the computing device;
a timing module operable to start a first timing in response to the computing device is started;
a control module operable to shut down an operating system of the computing device in response to the first timing reaching the sleep delay time "M", and force the computing device to sleep;
the timing module further operable to start a second timing in response to forcing the computing device to sleep;
the control module further operable to awaken the computing device remotely and restart the operating system of the computing device in response to the second timing reaching the awakening delay time "T";
a counting module operable to count a restart count of the computing device;
the reading module further operable to read a second hardware information of the computing device;
a comparison module operable to compare the second hardware information with the initial hardware information;
a storing module operable to store test results according to the comparison in a storage device;
a determination module operable to determine whether the restart count equals the predetermined restart count "N"; and
a display module operable to read the test results from the storage device and display the test results in response to the restart count equaling "N".

8. The remote computer as claimed in claim 7, wherein the controlling module further operable to awaken the computing device and send the MAC address to a network interface card (NIC) of the computing device in response to the second timing reaching the awakening delay time "T";
the NIC operable to compare the MAC address of the computing device with a MAC address of the NIC, and send a restarting signal to a baseboard management controller (BMC) of the computing device in response to the MAC address of the computing device and the MAC address of the NIC are the same;

the BMC operable to restart the operating system of the computing device after receiving the restarting signal.

9. The remote computer as claimed in claim 7, wherein the test results including comparison results of the second hardware information with the initial hardware information, if the second hardware information and the initial hardware information are different, the test results further include error codes or missing hardware information of the computing device.

* * * * *